United States Patent [19]

Caldwell

[11] Patent Number: 4,790,756
[45] Date of Patent: Dec. 13, 1988

[54] WORLD GLOBE GEOGRAPHIC AREA VIEWER

[75] Inventor: Bradley L. Caldwell, East Aurora, N.Y.

[73] Assignee: The Quaker Oats Company, Chicago, Ill.

[21] Appl. No.: 102,108

[22] Filed: Sep. 29, 1987

[51] Int. Cl.⁴ .............................................. G09B 27/08
[52] U.S. Cl. .................................... 434/145; 434/146; 434/147; 40/364
[58] Field of Search ............... 434/139, 145, 146, 147, 434/153, 131; 40/362, 364

[56] References Cited

U.S. PATENT DOCUMENTS

| | | | |
|---|---|---|---|
| 387,957 | 8/1888 | Moreon et al. | 434/146 |
| 480,413 | 8/1892 | Price | 434/131 |
| 1,335,923 | 4/1920 | Schrenkeisen | 434/145 |
| 1,487,173 | 3/1924 | Manion | 40/364 |
| 2,029,415 | 2/1938 | Dennis | 40/364 |
| 2,129,759 | 9/1938 | Goldman | 40/364 |
| 2,171,509 | 8/1939 | Peterson | 434/145 |
| 2,175,091 | 10/1939 | Peterson | 434/145 |
| 2,182,334 | 12/1939 | Crespo | 40/538 |
| 2,187,947 | 1/1940 | Marks | 434/146 |
| 2,355,304 | 8/1944 | Koch | 434/145 |
| 2,492,691 | 12/1949 | Dietz | 434/145 |
| 2,511,770 | 6/1950 | Dupler | 434/145 |
| 2,520,410 | 8/1920 | Jelinek | 40/364 |
| 2,550,799 | 5/1951 | Fuller | 40/364 |
| 2,941,313 | 6/1960 | Levin | 434/146 |
| 4,115,930 | 9/1978 | Beck | 434/131 |
| 4,257,180 | 3/1981 | Carpenter | 40/362 |
| 4,334,867 | 6/1982 | Friedman | 434/146 |
| 4,416,074 | 11/1983 | Guerrero et al. | 40/362 |

FOREIGN PATENT DOCUMENTS 616920  1/1949  United Kingdom ............... 434/145

Primary Examiner—James C. Yeung
Attorney, Agent, or Firm—Cumpston & Shaw

[57] ABSTRACT

An educational toy for familiarizing young people or children with different geographic areas of the world. The educational toy comprises a rotatable world globe on which is mounted a carrier at least partially encircling the globe along a meridian thereof. The carrier supports a film strip containing longitudinally spaced images of selected geographic areas of the globe. In addition, a viewer is slidably mounted on the carrier, and is slidably movable thereon to a selected position of latitude on the globe in which the viewer is substantially in register with a plurality of images on the carrier of a selected geographic area. Indicia on a light transmitting spot on a geographic area of the globe that corresponds to the images of the selected geographic area is movable by manual rotation of the globe into register with the viewer. The viewer is adjusted to view the indicia and then images of the selected geographic area on the film strip are moved into register with the viewer.

13 Claims, 4 Drawing Sheets

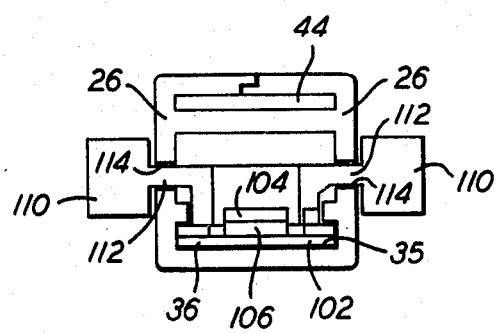
FIG. 6
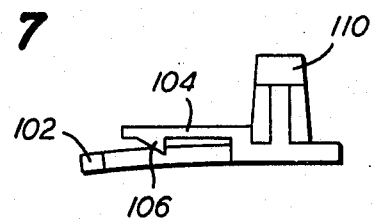
FIG. 7
FIG. 8
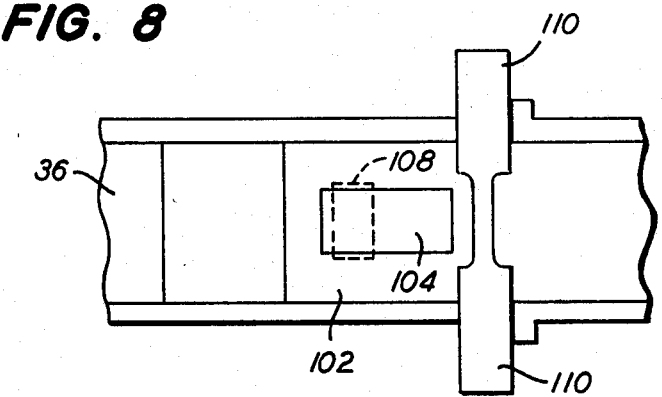

WORLD GLOBE GEOGRAPHIC AREA VIEWER

FIELD OF THE INVENTION

The present invention relates generally to toys, and more specifically to an educational toy for viewing images of a selected geographic area of a world globe.

BACKGROUND OF THE INVENTION

A tremendous need exists in the toy industry for ingenious educational toys for motivating youngsters to learn more about geographic areas of the world. An object of the present invention is to provide an educational toy in which important geographic areas of the world will become evident on the world globe, and which will also provide visual images of the culture of the people inhabiting that area.

SUMMARY OF THE INVENTION

Objects of this invention are accomplished by providing a world globe geographic area viewer for viewing images of a selected geographic area of a rotatably mounted globe comprising:

a film strip containing longitudinally spaced images of selected geographic areas of the globe;

carrier means for the film strip at least partially encircling the rotatable globe along a meridian thereof;

slider means slidably mounted on the carrier means movable to a selected position of latitude on the carrier means and globe in which the slider means is substantially in register with images of a selected geographic area;

indicia on a light-transmitting spot on a geographic area of the globe corresponding to the images of the selected geographic area is movable by manual rotation of the globe into register with the slider means; and viewing means on the slider means for viewing the images of the selected geographic area corresponding thereto.

A further object of the invention is accomplished by providing images on the film in a pair of rows, and means coupling the viewing means to the carrier means so that the viewing means are movable from one side of the slider means for viewing an image in one row to the other side of the slider means for viewing an image in the other row.

Still a further object of the invention is accomplished by providing means for moving the film strip in one direction in which a plurality of the images of a selected geographic area is viewed in one of the rows, and then moving the film strip in the opposite direction in which a plurality of images of the selected geographic area in the other row are viewed.

BRIEF DESCRIPTION OF THE DRAWINGS

In the detailed description of the invention presented below, reference is made to the accompanying drawings, in which:

FIG. 6 is an enlarged view in section taken substantially along line 6—6 of FIG. 1;

FIG. 7 is a side-elevational view of the film strip moving means of FIG. 6 with the film strip carrier omitted for purposes of clarity; and FIG. 8 is a top plan view of FIG. 6 with a portion of the film strip carrier omitted for purposes of clarity.

DETAILED DESCRIPTION OF THE INVENTION

Figure 1:
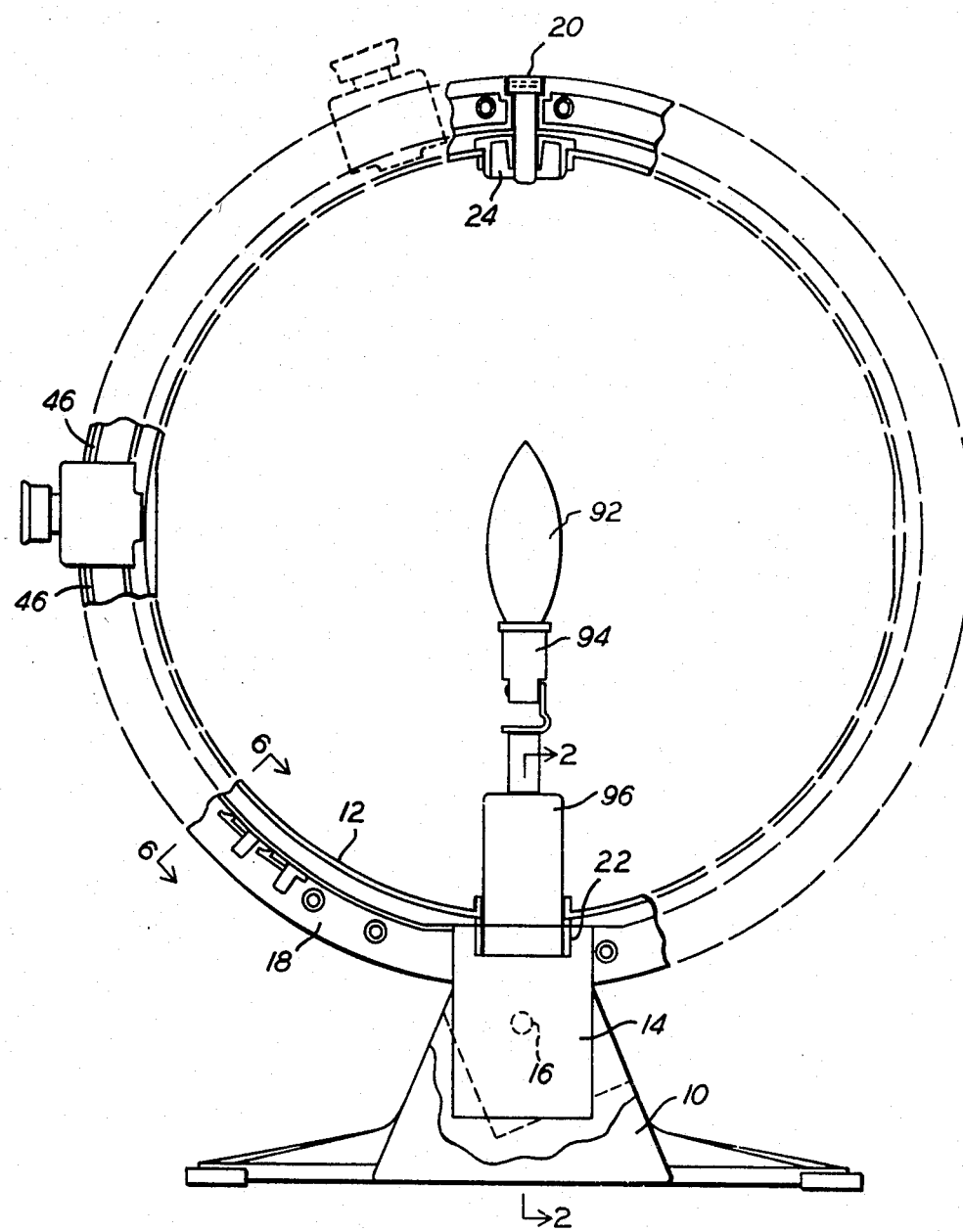
FIG. 1 is a side-elevational view of a preferred embodiment of a world globe geographic area viewer of this invention.
Figure 2:
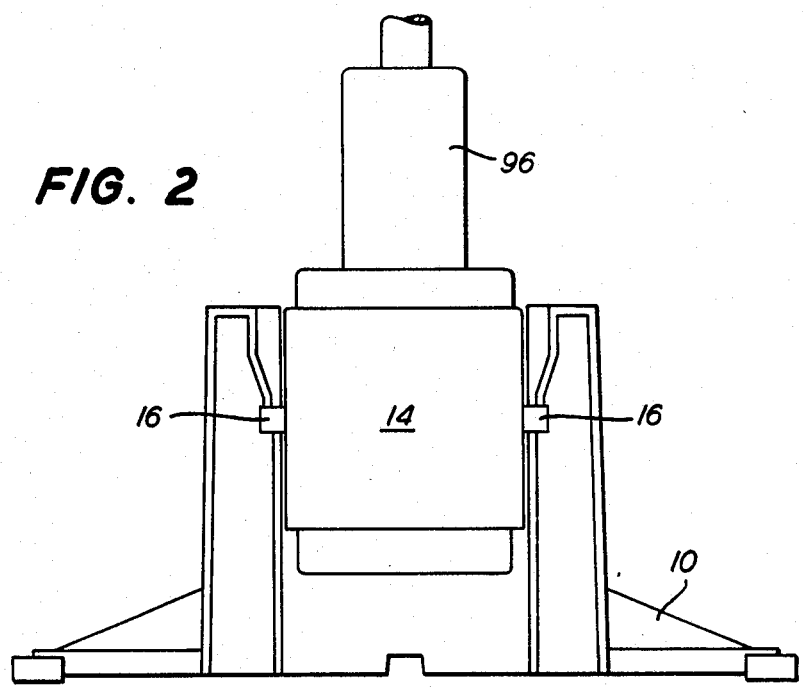
FIG. 2 is a section view taken substantially along line 2—2 of FIG. 1.

With reference to FIGS. 1 and 2, a preferred embodiment of a world globe geographic area viewer of this invention comprises a base 10 and a world globe 12 having a depending generally rectangular shaped housing 14. The housing has stub shafts 16 journaled in base 10 for pivotally supporting the globe for movement in a forward direction (left in FIG. 1 of the drawing) to enable the viewer to better observe the upper hemisphere, and in a rearward direction (to the right in FIG. 1) to enable the viewer to better view the lower hemisphere. Any suitable detent means, not shown, may be incorporated between base 10 and housing 14 to position globe 12 in the upright position shown in FIG. 1, and in the described forward and rearward positions.

A film strip carrier 18 comprises an endless, circular, tubular member completely encircling the globe. The carrier 18 is secured to housing 14 in the south pole region by any suitable brackets, not shown, and in the north pole region by a large bolt 20 and retainer arrangement. The globe 12 has a lower pivot 22 mounted for rotation within a portion of carrier 18 at the south pole region. The lower end of bolt 20 extends into a journal 24 at the north pole region to provide an upper pivot. The globe is rotatable about the upper and lower points within carrier tube 18.

Figure 3:
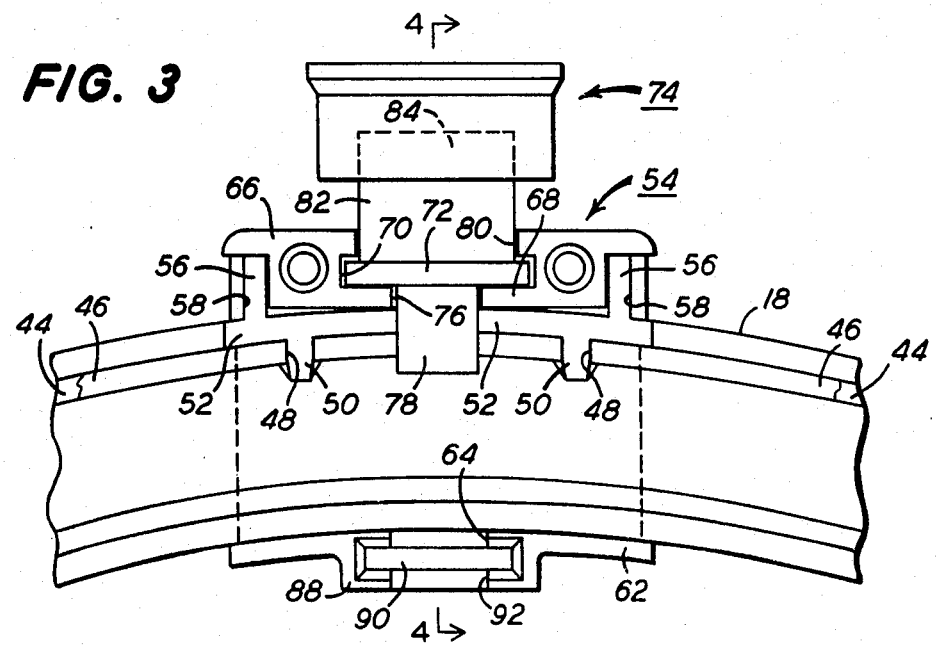
FIG. 3 is an enlarged side-elevational view in section of the slider means of FIG. 1.
Figure 4:
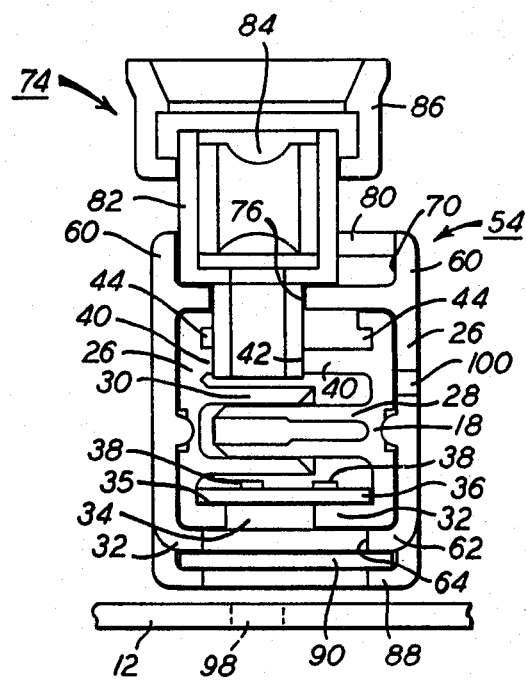
FIG. 4 is a section view taken substantially along line 4—4 of FIG. 3.
Figure 5:
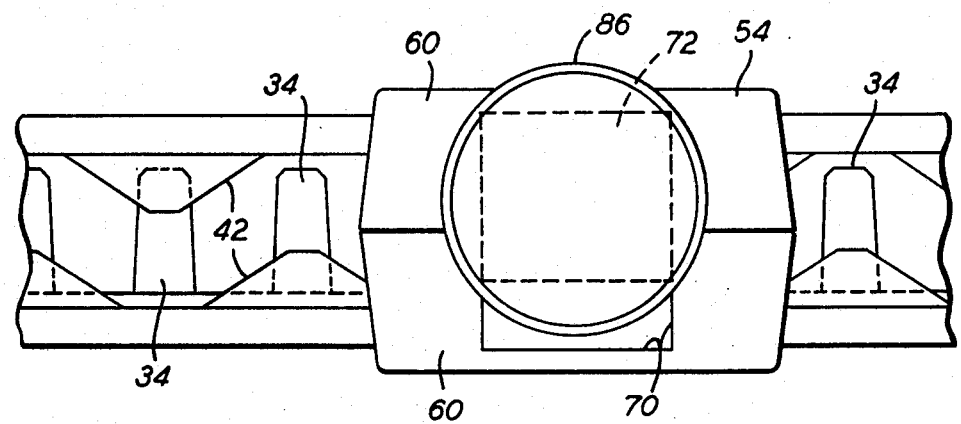
FIG. 5 is a top plan view of the slider means and carrier of FIG. 3 with the opaque cover web omitted for purposes of clarity.

With reference to FIGS. 1, and 3–5, but specifically FIG. 4, carrier 18 comprises a pair of facing side plates 26 that are joined together by posts 28 on one plate inserted into blind bores 30 on the other plate. The side plates 26 have laterally extending bottom walls 32 joined at facing ends thereof, as best seen in FIGS. 4 and 5, in which one of the walls is provided with slots 34. The walls 32 form a film track 35 for slidably supporting a film strip 36 containing at least two rows of longitudinally spaced small side-by-side image dots 38 (slides) of selected geographic areas of the world globe. Adjacent the top of side plates 26 a pair of laterally extending ribs 40 cooperate to form a sinusoidal slot 42, as best seen in FIG. 5.

Adjacent upper surface of ribs 40, side plates 26 are provided with facing grooves 44 to form a guideway for an opaque cover web 46 that preferably encircles globe 12 to prevent ambient light from entering carrier 18. With reference to FIG. 3, each end portion of the cover web 46 has slots 48 for receiving gripping pins 50 depending from L-shaped members 52. Each member is secured to one end of a slider means 54 by upwardly extending fingers 56 that nest in complementary slots 58 in the slider means. Accordingly, the opaque web 46 completely covers the upper end of carrier 18 and slides within guideway 44 upon movement of the slider means 54 along carrier 18. The guideway 44 extends through housing 14 and bolt 20 to completely encircle the globe.

With further reference to FIGS. 3 and 4, slider means 54 is shown that encircles carrier 18 and is mounted thereon for slidable movement. The slider means comprises two substantially identical U-shaped plate members 60 that are secured together by any suitable means. The bottom plate 62 laterally extending from side plates 60 has a curvature conforming to the curvature of carrier 18, and further has a slot 64 extending through the bottom wall from one side plate 60 to the other. The upper laterally extending walls 66 (FIG. 3) are relatively thick and have a lower shelf 68 terminating in grooves 70 for receiving the edges of a rectangular plate 72 on a viewer 74. The shelf 68 has a slot 76 for accommodating a guide tube 78. The upper wall 66 has a slot 80 for accommodating a lens tube 82 on the viewer containing a magnifying lens 84. A cylindrical eye-piece 86 extends upwardly from the magnifying lens. The guide tube 78 on viewer 74 extends into sinusoidal groove 42 and is slidable therealong for moving the viewer from one side of carrier 18, in which it is in alignment with one row of images 38, to the opposie side of the carrier, in which it is in alignment with another row of images.

The bottom plate 62 of slider means 54 further forms a grooved enclosure 88 havng an opening 92 in alignment with slot 64 in the viewer for receiving a filter element 90 for controlling the ambient light that might enter between slider means 54 and the outer globe surface, so that a person cannot view the images 38 along the carrier at any position of the viewer on the carrier. Accordingly the images 38 can be viewed only when viewer 74 is at its proper location on carrier 18.

Illumination for viewing images 38 of selected geographic areas is provided by a lamp 92 (FIG. 1) mounted in a known type of socket 94 and frame 96 which is connected to housing 14. Selected geographic areas to be viewed on globe 12 are provided with clear light-transmitting spots 98 (FIG. 4) in the globe of the area to be viewed. The clear spots 98 are numbered, and slider means 54 is properly located at that position by sliding the slider means along carrier 18 to an identical number on the side wall 26 of the carrier 18 which is viewable through an opening 100 (FIG. 4) in side wall 60 of the slider means 54. At that point, the slider means is located at the same latitude as the area to be viewed on the globe. The globe 12 is rotated until the clear spot and a number 98 on the globe is visible through the viewer. At that point, as seen in FIG. 4, light passes through the clear spot 98, filter 90, film strip 36 and through the lens tube 82 to eye piece 86. The film strip 36 is slidably moved by a film strip moving means to position one row of film images 38 on the film strip one at a time in the optical path of viewer 74 for viewing. After all the images 38 in that row have been viewed, the operator moves viewer 74 along the sinusoidal slot 42 to the other side of film carrier 18, and the operator again slidably moves film strip 36 to view the film images 38 in the other row of film images.

With reference to FIGS. 6—8, the film strip moving means comprises a plate member 102 slidably mounted on slide track 35 of carrier 18. The plate member 102 has an extending finger 104 with a hook 106 at the end thereof for gripping a notch 108 in the end of film strip 36. The slide moving means is movable by manually engagable tabs 110 extending laterally outwardly from side walls 26 of carrier. The tabs 110 are connected to plate 102 by arms 112 extending through elongated slots 114 in side walls 26 of the carrier.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A world globe geographic area viewer for viewing images of a selected geographic area of a rotatably mounted globe along a selected meridien thereof comprising:
    a film strip containing longitudinally spaced images of selcted geographic areas of the globe;
    carrier means for the film strip at least partially encircling the rotatable globe along a meridien thereof;
    slider means slidably mounted on the carrier means movable to a selected position of latitude on the globe in which the slider means are substantially in register with images of a selected geographic area;
    indicia on a geographic area of the globe corresponding to the images of the selected geographic area movable by manual rotation of the globe into register with the slider means; and
    viewing means on the slider means for viewing the indicia and the images of the selected geographic area corresponding thereto.

2. A world globe geographic area viewer according to claim 1, wherein the images are mounted on the film in a pair of rows, and means are provided coupling the viewing means to the carrier means so that the viewing means are movable from one side of the slider means for viewing an image in one row to the other side of the slider means for viewing an image in the other row.

3. A world globe geographic area viewer according to claim 2 wherein the coupling means comprises a cam follower on the viewing means slidably movable along a sinusoidal cam surface on the carrier.

4. A world globe geographic area viewer according to claim 3 wherein the cam follower comprises a depending cylindrical tube and the cam surface comprises a sinusoidal slot within which the tube is guided.

5. A world globe geographic area viewer according to claim 4 wherein the viewing means comprises an eye-piece.

6. A world globe geographic area viewer according to claim 5, and further comprising lamp means mounted within the globe for illuminating the globe and film.

7. A world globe geographic area viewer according to claim 5, and further comprising cover means slidably mounted on the carrier means for covering and protecting the film strip.

8. A world globe geographic area viewer according to claim 7 wherein the cover means comprises a web slidably mounted on the carrier means and having one end thereof secured to one end of the slider means and the opposite end thereof secured to the opposite end of the slider means.

9. A world globe geographic area viewer according to claim 5 wherein the film strip is slidably mounted on the carrier means, and means are provided on the carrier means for moving the film strip between a first position in which one half of the images of a selected geographic area in a pair of rows are viewed upon movement of the film strip in one direction, and a second position in which the other half of the images of the selected geographic area in the pair of rows are viewed upon movement of the film strip in the opposite direction.

10. A world globe geographic area viewer according to claim 9 wherein the film strip moving means comprises gripping means slidably mounted on the carrier means for releasably gripping one end of the film strip, and finger engaging tabs on the gripping means by which the film strip is movable.

11. A world globe geographic area viewer comprising:

a globe body having indicia thereon representing a plurality of geographic areas;

a cursor movable over the surface of the globe body into a plurality of positions each position aligned with a selected one of said geographic areas;

storage means for storing a plurality of images each related to one of said geographic areas;

viewing means for observing a selected one of said images; and means coupled to said cursor means and said storage means for aligning a selected one of said images with said viewer, said image corresponding to the geographic area with which said cursor is aligned.

12. The world globe geographic area viewer of claim 11 in which said storage means comprises film.

13. The world globe geographic area viewer of claim 11 wherein said cursor comprises means slidably mounted on a track at least partially encircling the globe body and wherein said globe body is rotatably mounted with respect to said track.

* * * * *